United States Patent
Koide et al.

(10) Patent No.: US 9,817,262 B2
(45) Date of Patent: Nov. 14, 2017

(54) FRONT PLATE OF TN LIQUID CRYSTAL PANEL

(75) Inventors: Koshi Koide, Chiba (JP); Osamu Kakinoki, Tokyo (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days.

(21) Appl. No.: 13/824,157

(22) PCT Filed: Aug. 8, 2011

(86) PCT No.: PCT/JP2011/068490
§ 371 (c)(1),
(2), (4) Date: May 29, 2013

(87) PCT Pub. No.: WO2012/035919
PCT Pub. Date: Mar. 22, 2012

(65) Prior Publication Data
US 2013/0251919 A1   Sep. 26, 2013

(30) Foreign Application Priority Data
Sep. 17, 2010   (JP) ................................. 2010-208838

(51) Int. Cl.
*G02F 1/1335* (2006.01)
*G02F 1/1333* (2006.01)
(Continued)

(52) U.S. Cl.
CPC ...... *G02F 1/1335* (2013.01); *G02F 1/133308* (2013.01); *B32B 2457/202* (2013.01);
(Continued)

(58) Field of Classification Search
None
See application file for complete search history.

(56) References Cited

U.S. PATENT DOCUMENTS 6,342,934 B1 * 1/2002 Kameyama et al. ........... 349/98
7,612,845 B2 * 11/2009 Mori et al. ..................... 349/96
(Continued)

FOREIGN PATENT DOCUMENTS

| CN | 1991494 | 7/2007 |
|---|---|---|
| JP | 9-325216 | 12/1997 |

(Continued)

OTHER PUBLICATIONS

Japan Office action in JP 533,923/2012, dated May 20, 2014 along with an english translation thereof.
(Continued)

*Primary Examiner* — Anthony J Frost
(74) *Attorney, Agent, or Firm* — Greenblum & Bernstein, P.L.C.

(57) ABSTRACT

The problem is to provide a front plate of a TN liquid crystal panel capable of inhibiting occurrence of color unevenness caused by retardation of a polycarbonate resin sheet, even when a liquid crystal panel is observed through polarizing glasses or liquid crystal shutter glasses for 3D, while having excellent impact resistance, heat resistance and transparency.
The solution means is the front plate 1 of a TN liquid crystal panel provided with the polycarbonate resin sheet 10, wherein the direction of the slow axis X or the fast axis Y of the polycarbonate resin sheet 10 is inclined by 45° with respect to the lengthwise direction L of a liquid crystal panel.

11 Claims, 3 Drawing Sheets

(51) Int. Cl.
G02F 1/13363 (2006.01)
G02F 1/139 (2006.01)

(52) U.S. Cl.
CPC ........ *G02F 1/1396* (2013.01); *G02F 1/13363* (2013.01); *G02F 2001/133331* (2013.01); *G02F 2201/50* (2013.01); *Y10T 428/105* (2015.01)

(56) References Cited

U.S. PATENT DOCUMENTS

| | | | |
|---|---|---|---|
| 7,619,706 B2 | 11/2009 | Yano et al. | |
| 2006/0012061 A1 | 1/2006 | Hirata et al. | |
| 2006/0066776 A1* | 3/2006 | Isobe | G02F 1/13363 349/102 |
| 2007/0165170 A1* | 7/2007 | Fukuda | 349/138 |
| 2009/0169770 A1* | 7/2009 | Padiyath et al. | 427/577 |
| 2009/0274902 A1* | 11/2009 | Kume | 428/336 |
| 2010/0026918 A1* | 2/2010 | Nakagawa | G02B 5/3083 349/5 |
| 2010/0060833 A1 | 3/2010 | Ochiai et al. | |

FOREIGN PATENT DOCUMENTS

| | | |
|---|---|---|
| JP | 2005-157082 | 6/2005 |
| JP | 2006-103169 | 4/2006 |
| JP | 2010-85978 | 4/2010 |
| JP | 2010-179640 | 8/2010 |
| TW | 356530 | 4/1999 |
| TW | 302611 | 11/2008 |
| TW | 325450 | 6/2010 |
| TW | 325991 | 6/2010 |
| TW | 201020315 | 6/2010 |

OTHER PUBLICATIONS

Search report from E.P.O. in EP 11824927.5, dated Nov. 10, 2014.
China Office action, dated Mar. 30, 2015 along with an English translation thereof.
Taiwanese Office action, dated Mar. 23, 2015 along with an English translation thereof.
Chinese Office Action issued with respect to application No. 201180050107.1, dated Oct. 19, 2015.
U.S. Appl. No. 13/879,176 to Koshi Koide et al., filed Apr. 12, 2013.
Search report from International Application No. PCT/JP2011/068490, dated Oct. 18, 2011.

* cited by examiner (a)

(b)

FRONT PLATE OF TN LIQUID CRYSTAL PANEL

TECHNICAL FIELD

This invention relates to a front plate of a TN liquid crystal panel, particularly to a front plate of a TN liquid crystal panel capable of inhibiting occurrence of coloring and color unevenness, caused by retardation of a polycarbonate resin sheet and unevenness thereof, even when a liquid crystal panel is observed through polarizing glasses or liquid crystal shutter glasses for 3D, while having excellent impact resistance, heat resistance and transparency.

RELATED ART

For purpose of protecting a liquid crystal panel and the like, a front plate of the liquid crystal panel is provided. Materials used for a conventional front plate of a liquid crystal display include a (meth)acryl resin represented by poly(methyl methacrylate) (PMMA).

Moreover, in recent years, a front plate comprising a sheet of polycarbonate resin has been used, in terms of having high impact resistance, heat resistance, secondary processability, light weight and transparency. Particularly, a front plate of a liquid crystal panel further comprising a hard coat provided on a multiple layer sheet having an acryl resin laminated on a surface layer of a polycarbonate resin sheet, which has excellent impact resistance, heat resistance, processability and transparency of a polycarbonate resin while having surface hardness and scratch resistance equivalent to a conventional acryl resin with a hard coat, has been widely adopted as a liquid crystal display front plate (For example, see Patent Document 1).

The above front plate of a liquid crystal panel comprising a polycarbonate resin sheet is typically formed by a melt extrusion method with an acryl resin. In a polycarbonate resin sheet formed by a melt extrusion method, molecules constituting a polycarbonate resin orientate due to influences of resin temperature, cooling roll temperature, take-up speed and the like, and cause retardation. Here, "retardation" in the invention is represented by (nx−ny)×d in a nm unit, wherein nx is the principal refractive index of the slow axis within a sheet surface, ny is the principal refractive index of the fact axis, and d is the thickness of a sheet.

In addition, regarding an acryl resin, since the appearance of orientated double refraction by stretching is extremely limited, retardation can be considered to be substantially 0. Also, since a hard coat layer is a cured resin product at a non-orientated state having a three dimensional network structure by crosslinking reaction and the thickness is as thin as about a few microns, retardation can similarly be considered to be substantially 0.

When a polycarbonate resin sheet with such retardation is cut aligning the lengthwise and widthwise sides to the extrusion direction upon production, and used as a front plate of a liquid crystal panel releasing polarized light in the vertical direction of a TV screen such as VA mode or IPS mode, the transmission axis of a polarizing plate on the liquid crystal panel front surface becomes parallel to the fast axis or the slow axis within a surface of a polycarbonate resin sheet, and polarized light from a liquid crystal panel passes through a front plate while maintaining the vertical direction of a screen. Therefore, when an image displayed on a liquid crystal display is observed with polarizing glasses or TN liquid crystal shutter glasses for 3D with the transmission axis in the vertical direction, a usual image can be seen unless the head is inclined.

However, when the polycarbonate resin sheet described above is used as a front plate of a TN liquid crystal panel releasing polarized light of an angle of 45° widely used as a personal computer monitor and the like, since the transmission axis of a polarizing plate on the TN liquid crystal panel front surface and the fast or the slow axis within a surface of a polycarbonate resin sheet of a front plate form an angle of 45°, it is converted into various elliptically-polarized light depending on the above retardation of a front plate and wavelength. Therefore, there is a problem that when an image displayed on a liquid crystal display is observed with polarizing glasses or TN liquid crystal shutter glasses for 3D with the transmission axis in the vertical direction, the light transmittance varies depending on wavelength, and so-called interference color from parallel nicols to crossed nicols is observed in an image.

Furthermore, there is a problem that when retardation of a polycarbonate resin sheet of the above front plate has unevenness within a surface, thereby it becomes an image with further poor visibility.

PRIOR ART DOCUMENT

Patent Document 1: JP-A-2006-103169

SUMMARY OF THE INVENTION

Problem to be Solved by the Invention

The object of the invention is, by trying to optimize a polycarbonate resin sheet, to provide front plate of a TN liquid crystal panel capable of inhibiting occurrence of coloring and color unevenness, caused by retardation of a polycarbonate resin sheet and unevenness thereof, even when a liquid crystal panel is observed through polarizing glasses or liquid crystal shutter glasses for 3D, while having excellent impact resistance, heat resistance and transparency.

Means for Solving the Problem

The inventors have, as a result of keen examinations to solve the above problem for a front plate of a TN liquid crystal panel comprising a polycarbonate resin sheet, discovered that by inclining the direction of the slow axis or the fast axis of a polycarbonate resin sheet by 45° with respect to the lengthwise direction of a TN liquid crystal panel, light parallel to one of either the slow axis or the fast axis upon passes through a polycarbonate resin sheet and is not converted into elliptically-polarized light, so the above problem can be solved.

The invention is made based on such findings, and the summary is as follows.

(1) A front plate of a TN liquid crystal panel comprising a polycarbonate resin sheet, wherein the direction of the slow axis or the fast axis of the polycarbonate resin sheet is inclined by 45° with respect to the lengthwise direction of a TN liquid crystal panel.

(2) A front plate of a TN liquid crystal panel according to the above item (1), wherein a polycarbonate resin constituting the polycarbonate resin sheet has 2,2-bis(4-hydroxyphenyl)propane as a main raw material monomer, the viscosity average molecular weight within a range of 20,000 to 30,000, and the glass transition temperature within a range of 130 to 160° C.

(3) A front plate of a TN liquid crystal panel according to the above item (1), wherein the thickness of the polycarbonate resin sheet is within a range of 0.3 to 2 mm.

(4) A front plate of a TN liquid crystal panel according to the above item (1), further comprising a hard resin layer with a thickness within a range of 30 to 100 μm and the pencil hardness at a laminated state measured according to JIS5600-5-4 of at least F or more, the hard resin layer is obtained by coextrusion molding with the polycarbonate resin provided on the front surface or the back surface of the polycarbonate resin sheet.

(5) A front plate of a TN liquid crystal panel according to the above item (4), wherein the hard resin layer consists of an acryl resin, a resin (nuclear hydrogenated MS resin) obtained by hydrogenating an aromatic ring of a copolymer obtained by polymerizing at least one kind of meth(acrylate ester monomer and at least one kind of aromatic vinyl monomer, or a modified polycarbonate resin having 2,2-bis (4-hydroxy-3-methylphenyl)propane or 2,2-bis(4-hydroxy-3-methylphenyl)cyclohexane as a main raw material monomer.

(6) A front plate of a TN liquid crystal panel according to the above item (5), wherein the acryl resin is methyl methacrylate as a main raw material monomer and the glass transition temperature of not less than 95° C.

(7) A front plate of a TN liquid crystal panel according to the above item (5), wherein the nuclear hydrogenated MS resin is a resin obtained by hydrogenating an aromatic ring of a copolymer obtained by polymerizing methyl methacrylate and styrene hydrogenated, a copolymerization ratio of them is within a range of 60:40 to 90:10, and the hydrogenation ratio of an aromatic ring is not less than 70%.

(8) A front plate of a TN liquid crystal panel according to the above item (5), wherein the modified polycarbonate resin is a copolymer of 2,2-bis(4-hydroxy-3-methylphenyl) propane and 2,2-bis(4-hydroxyphenyl)propane, and a copolymerization ratio of them is 50:50 to 100:0.

(9) A front plate of a TN liquid crystal panel according to the above item (5), wherein the modified polycarbonate resin is a copolymer of 2,2-bis(4-hydroxy-3-methylphenyl) cyclohexane and 2,2-bis(4-hydroxyphenyl)propane, and a copolymerization ratio of them is 50:50 to 100:0.

(10) A front plate of a TN liquid crystal panel according to the above item (5), further comprising a hard coat membrane formed on the top front surface or the top back surface of the TN liquid crystal panel.

(11) A front plate of a TN liquid crystal panel according to the above item (9), wherein the hard coat membrane consists of an ultraviolet curable acryl based resin composition, the thickness is within a range of 1 to 20 μm, and the pencil hardness at a laminated state measured according to JIS5600-5-4 is 3H or more.

Effect of the Invention

By using the front plate of a TN liquid crystal panel of the invention, it is possible to perform excellent impact resistance, heat resistance and transparency, and further inhibit occurrence of coloring and color unevenness, caused by retardation of a polycarbonate resin sheet and unevenness thereof, even when a liquid crystal panel is observed through polarizing glasses or liquid crystal shutter glasses for 3D.

MODE FOR CARRYING OUT THE INVENTION

Figure 1:
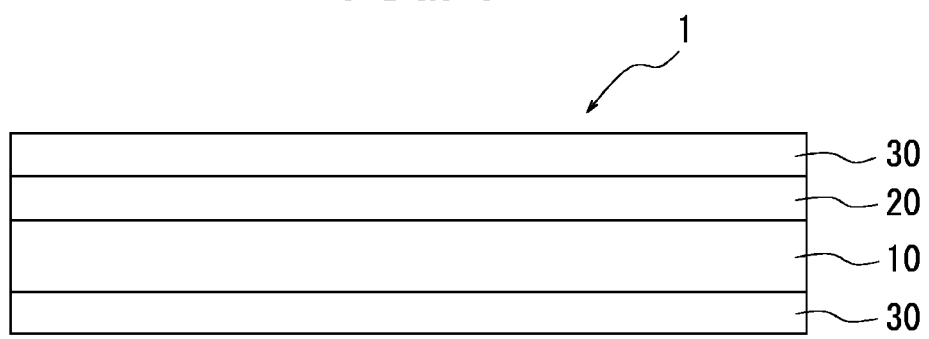
FIG. 1 is a view schematically showing a cross section of the front plate of a TN liquid crystal panel according to the invention.

The front plate of a TN liquid crystal panel of the invention is, as shown in FIG. 1, comprising a polycarbonate resin sheet 10. Here, the front surface of a polycarbonate resin sheet refers to a surface on the user side when used for a liquid crystal display, and the back surface refers to a surface on the liquid crystal panel side when used for a liquid crystal display.

Figure 2:
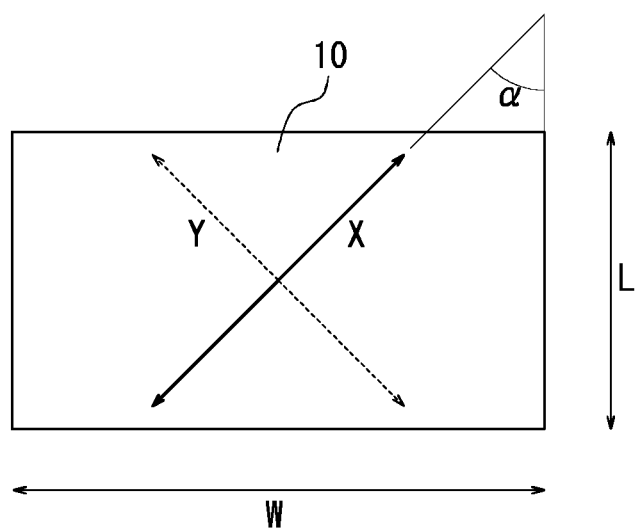
FIG. 2 is a plane view for illustrating the fast axis and the slow axis of the polycarbonate resin sheet according to the invention.

Moreover, the front plate of a TN liquid crystal panel of the invention is, as shown in FIG. 2, characterized that the direction of the slow axis X or the fast axis Y of the polycarbonate resin sheet 10 is inclined by 45° with respect to the lengthwise direction L of a TN liquid crystal panel (i.e., The angle α formed by the slow axis X and the lengthwise direction L is 45°).

Here, the slow axis refers to an axis where the refractive within a sheet surface is maximized, and the fast axis is an axis crossed with the slow axis within a surface and an axis where the refractive within a sheet surface is minimized. Also, the lengthwise and widthwise directions of the liquid crystal panel refer to the lengthwise and widthwise directions in the case of being used for a liquid crystal display, and in FIG. 2, the direction represented by an arrow Y is the lengthwise direction and the direction represented by an arrow W is the widthwise direction.

Figure 3:
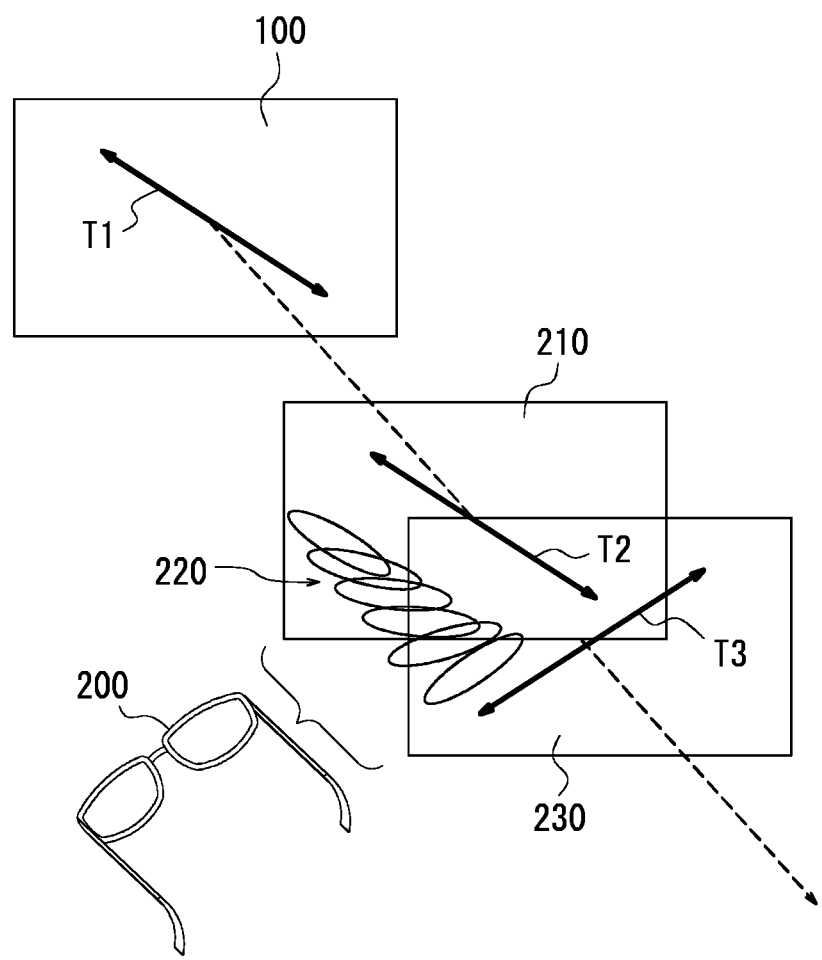
FIG. 3 is a view for illustrating a state when a TN liquid crystal panel is observed through liquid crystal shutter glasses for 3D.

FIG. 3 shows a state where a TN liquid crystal panel 100 is observed through liquid crystal shutter glasses for 3D 200.

When the conventional front plate 10 for a TN liquid crystal panel is used, polarized light with an angle of 45° from the front polarizing plate 100 of a liquid crystal panel transmits through a glasses front side polarizing plate 210 as it is and rotates at a twisted nematic liquid crystal layer 220, the polarized direction rotates by 90° (the polarized light transmission axis rotates by 90°), and it transmits through the transmission axis of a glasses back side polarizing plate 230 as it is. When a front plate is provided on the front surface of the liquid crystal panel 100, and arranged by aligning the fast axis or the slow axis of the polycarbonate layer 10 with the vertical direction of a screen, as described above, there is a problem that interference colour through observation under the parallel nicols is generated (colour unevenness caused by retardation unevenness within a surface occurs).

In the invention, as shown in FIG. 2, by inclining the direction of the slow axis X or the fast axis Y of the polycarbonate resin sheet 10 by 45° with respect to the lengthwise direction L of the sheet 10, the transmission axis T1 of the front polarizing plate 100 of the liquid crystal panel is in the parallel or crossed relationship with the fast axis Y or the slow axis X of the polycarbonate resin sheet 10 of the front plate 1 for a TN liquid crystal panel of the invention, polarized light of all wavelengths with an angle of 45° from a liquid crystal panel progresses while maintaining the inclination of 45° without being disturbed by the front plate 1. More specifically, it becomes possible to transmit polarized light of all wavelengths generated from the liquid crystal panel 100 without knowing the existence of the front plate 1. Moreover, by inclining the head by 90° with the TN liquid crystal shutter glasses for 3D 200 on, the front polarizing plate 100 of the TN liquid crystal panel and the front side polarizing plate 210 of the TN liquid crystal shutter glasses for 3D 200 are in the relationship of crossed nicols, so light transmission is blocked, an image becomes black and it becomes impossible to visually recognize it (hereinafter, referred to as "blackout"). Since the transmittance of all wavelengths in visible range equally decreases without coloring until the head is inclined by 90°, coloring does not occur. As a result of above, interference color through observation under the parallel nicols and color unevenness thereof caused by retardation of a polycarbonate resin sheet can be inhibited.

Here, while the direction of the slow axis X or the fast axis Y of the polycarbonate resin sheet 10 is inclined by 45° with respect to the lengthwise direction L of the sheet 10, since the polarized state of linearly polarized light from a TN liquid crystal panel is disturbed only slightly when the inclination angle is close to 45°, interference color (color unevenness) through observation under the parallel nicols caused by retardation of a polycarbonate resin sheet can be inhibited similarly to the case of 45°. This means angular aberration occurring to sheet cutting accuracy and the like, which is 45° in a design aspect, so it is desirable to cut with a target of 45°. In order to research the allowable angle, a function test was conducted using a laptop computer equipped with white LED as backlight, Mini 210 Vivienne Tam Edition manufactured by HP. When a polycarbonate resin sheet with the retardation value in a wavelength of 590 nm of about 1000 to 3000 nm was observed in parallel nicols, it was discovered that although it was colored in pink as the slow axis of a polycarbonate resin sheet was further inclined from an angle of 45°, the aberration amount within ±10° from 45° can be visually accepted.

Below, each component of the front plate of a TN liquid crystal panel of the invention will be described.

(Polycarbonate Resin Sheet)

The front plate 1 of a TN liquid crystal panel of the invention is, as shown in FIG. 1, provided with the polycarbonate resin sheet 10. In the polycarbonate resin sheet 10, as shown in FIG. 2, the direction of the slow axis X or the fast axis Y of the polycarbonate resin sheet is inclined by 45° with respect to the lengthwise direction L of the sheet 10, but other configuration requirements (film thickness, material, production method, etc.) are not particularly limited.

Also, a polycarbonate resin constituting the polycarbonate resin sheet 10 is preferable to be a thermoplastic polycarbonate polymer capable of containing a branched structure obtained by a polycondensation reaction (interface method) between an aromatic dihydroxy compound and phosgene or obtained by an ester exchange reaction (melt method) between an aromatic dihydroxy compound and diester carbonate, and to have 2,2-bis(4-hydroxyphenyl)propane as a main raw material monomer. It should be noted that to have the above 2,2-bis(4-hydroxyphenyl)propane as a main raw material monomer means to contain the raw material monomer in not less than 50%. A polycarbonate polymer of the raw material monomer has high heat stability and transparency, and is extremely preferable as a liquid crystal panel front plate. However, retardation is easy to occur in the sheet production step, and in order to control variations thereof, close attention is required to be paid. In addition, there are problems of large photoelasticity and optical strain due to stress, but these problems can be solved by the usage method of the invention.

Moreover, the polycarbonate resin is preferable to have the viscosity average molecular weight within a range of 20,000 to 30,000. The viscosity average molecular weight within the above range is suitable to form the polycarbonate resin sheet 10 by normal extrusion molding, and when the viscosity average molecular weight is more than 30,000, sufficient processability is liable not to be obtained. Also, when the viscosity average molecular weight is less than 20,000, physical properties such as impact resistance are poor, which is not preferable.

Furthermore, the polycarbonate resin is preferable to have the glass transition temperature within a range of 130 to 160° C. When the glass transition temperature is less than 130° C., the characteristic of high heat resistance of a polycarbonate resin becomes weak, and for example, it becomes difficult to develop it into a product for in vehicle application highly likely to be exposed to high temperature. On the other hand, when the glass transition temperature is not less than 160° C., the set temperature upon extrusion molding must be high, and problems such as deterioration of color phase and generation of foreign substances are easy to occur.

Also, various additives typically used may be added to the polycarbonate resin, and additives include, for example, antioxidant, anti-coloring agent, ultraviolet absorber, flame retardant, mold release agent, lubricant, antistatic agent, dye and the like.

Moreover, the polycarbonate resin sheet 10 is preferable to have the thickness within a range of 0.3 to 2 mm. When the thickness is less than 0.3 mm, the polycarbonate resin sheet 10 becomes too thin, mechanical properties such as bending strength particularly decrease and a function as a front plate for protecting liquid crystal is liable not to be performed, and on the other hand, when the thickness is more than 2 mm, the polycarbonate resin sheet 10 becomes too thick, a liquid crystal panel unit becomes thick, and a merit as a thin model display device is liable to be weakened.

Furthermore, the polycarbonate resin sheet 10 is typically formed by a melt extrusion method. Regarding the polycarbonate resin sheet formed by a melt extrusion method, molecules constituting a polycarbonate resin have orientation (stretch orientation of polycarbonate molecules) due to influences of resin temperature, cooling roll temperature, take-up speed and the like, thereby double refraction occurs, and retardation occurs. The polycarbonate resin sheet 10 has retardation of normally about 1000 to 3000 nm, and inplane unevenness of retardation (P-V) of about 200 to 500 nm (retardation of "Lupilon Sheet D02 (multilayer sheet of polycarbonate resin and acryl resin)" manufactured by Mitsubishi Gas Chemical Company Inc. is measured). When retardation within a surface is less than 1000 nm, even with external force applied to a polycarbonate resin sheet generated upon mounting on a bezel, since the amount of stress double refraction (photoelasticity) caused thereby is an ignorable amount as compared to the amount of retardation within a surface by orientated double refraction, coloring and color unevenness caused by stress (external force) are not visually recognized. Thus, the inplane retardation is desirable to be not less than 1000 nm. Moreover, regarding the inplane unevenness of the inplane retardation, since the polarized state of linearly polarized light from a TN liquid crystal panel is not disturbed if the orientation axis is aligned, the inplane unevenness of retardation is ignored.

In addition, when retardation of the polycarbonate resin sheet 10 is not more than 1000 nm, by uniaxial stretching the polycarbonate resin sheet 10 in the extrusion direction using a stretching device and the like, it is also possible to control it within an adequate range. Moreover, if a sheet wherein the slow axis is inclined with respect to the longitudinal direction by inclined stretching is obtained, the cutting efficiency increases, and the yield rate improves. In this case, it is most desirable to be a sheet where the slow axis is inclined by 45° with respect to the longitudinal direction.

Furthermore, cutting is performed as the direction of the slow axis X or the fast axis Y of the polycarbonate resin sheet 10 is inclined by 45° with respect to the lengthwise direction L of a TN liquid crystal panel, more specifically the direction of the slow axis X or the fast Y is inclined by 45° with respect to the lengthwise direction L of the polycarbonate resin sheet 10.

(Hard Resin Layer)

The front plate 1 of a TN liquid crystal panel according to the invention is, as shown in FIG. 1, preferable to have a hard resin layer 20 provided on the front surface or the back surface (only on the front surface in FIG. 2) of the polycarbonate resin sheet 10, in terms of improving scratch resistance and surface hardness. Here, the hard resin layer 20 refers to a layer formed with the polycarbonate resin sheet 10 or formed on the polycarbonate resin sheet 10 with a purpose of improving scratch resistance and surface hardness. Materials constituting the hard resin layer 20 are not particularly limited as long as the desired scratch resistance and surface hardness can be ensured, and for example, a (meth)acryl resin can be used.

Moreover, the hard resin layer 20 is preferable to have the thickness within a range of 30 to 100 μm, in terms of ensuring the desired scratch resistance and surface hardness. When the thickness is less than 30 μm, it is liable not to have sufficient scratch resistance and surface hardness, and on the other hand, when the thickness is more than 100 μm, a layer is too thick and impact resistance and processability of the front plate 1 of a TN liquid crystal panel are liable to decrease.

Furthermore, the hard resin layer 20 is preferable to have the pencil hardness at a laminated state measured according to JIS5600-5-4 of at least F or more, preferably H or more, in terms of ensuring the desired scratch resistance and surface hardness. Since the pencil hardness of a polycarbonate resin is only at least 2B, it is not preferable as a liquid crystal front surface protecting plate as it is, but by providing the hard resin layer 20 on the surface of the polycarbonate resin sheet 10 so that the pencil hardness is F or more, the surface becomes hard to be scratched and it becomes possible to ensure minimum performance as a front surface protecting plate. Moreover, if the pencil hardness of a sheet having the hard resin layer 20 laminated is F or more, it is possible to increase the pencil hardness at a laminated state after hard coating to about 3H, and grant sufficient performance as a liquid crystal front surface protecting plate.

In addition, although it is also possible to provide the hard resin layer 20 by a thermal lamination method and the like, one provided therewith by coextrusion molding with the polycarbonate resin is preferable. A device used for coextrusion molding includes, for example, a multilayer molding machine comprising one main extruder for extruding a polycarbonate resin and sub extruders for extruding resins constituting the hard resin layer 20. Normally, the sub extruder which is smaller than the main extruder is adopted. The temperature condition of the main extruder is normally 230 to 290° C., preferably 240 to 280° C., and the temperature condition of the sub extruder accordingly depends on the kind of the hard resin layer and is normally 220 to 270° C., preferably 230 to 260° C. since a difference with the set temperature condition of the main extruder is preferable to be smaller. Also, in order to remove foreign substances within a resin, it is preferable to arrange a polymer filter on the upper stream side than a T die of the extruder.

As a method for laminating two kinds of molten resins, well known methods such as feed block type and multi manifold type can be used. In this case, molten resins laminated by the feed block are led to a sheet molding die such as a T die, molded into a sheet state, and led by a molding roll (polishing roll) having a surface mirror-treated to form a melt bank (resin rich area) between two molding rolls. This sheet state molded product is subjected to mirror finishing and cooling during passing through molding rolls to form a laminate. Also, in the case of a multi manifold die, although laminating is conducted after each molten resin is expanded into a sheet state inside the die, subsequently, similarly to the feed block type, it is subjected to mirror finishing and cooling with a molding roll to form a laminate. The die temperature is normally 250 to 310° C., preferably 260 to 300° C., and the molding roll temperature is normally 90 to 190° C., preferably 100 to 180° C. The roll molding machine can accordingly use a vertical type roll molding machine or a horizontal type roll molding machine.

Moreover, the hard resin layer 20 is preferable to comprise an acryl resin, a resin (nuclear hydrogenated MS resin) obtained by hydrogenating an aromatic ring of a copolymer obtained by polymerizing at least one kind of (meth)acrylate ester monomer and at least one kind of aromatic vinyl monomer, or a modified polycarbonate resin having 2,2-bis(4-hydroxy-3-methylphenyl)propane or 2,2-bis(4-hydroxy-3-methylphenyl)cyclohexane as a main raw material monomer.

The acryl resin is preferable to have methyl methacrylate as a main raw material monomer and the glass transition temperature of not less than 95° C. When the glass transition temperature is less than 95° C., in addition to difficulty in ensuring heat resistance required for a liquid crystal front plate, a decrease in surface hardness is recognized. It should be noted that "methyl methacrylate as a main raw material monomer" means having methyl methacrylate in not less than 50%, preferably not less than 70% of all raw material monomers. By having methyl methacrylate as a main raw material monomer, it becomes possible to ensure adhesion with a polycarbonate resin sheet in coextrusion molding.

The nuclear hydrogenated MS resin is preferable to be a resin obtained by hydrogenating an aromatic ring of a side chain of a copolymer obtained by polymerizing methyl methacrylate and styrene partially hydrogenated, to have a copolymerization ratio of them within a range of 60:40 to 90:10, and to have the hydrogenation ratio of an aromatic ring of not less than 70%. By using the nuclear hydrogenated MS resin, there is an effect of reducing occurrence of a warp of a liquid crystal front plate. When the copolymerization ratio between methyl methacrylate and styrene is less than 60:40, adhesion with a polycarbonate resin is not sufficient and there is the possibility of exfoliating at the interface thereof. On the other hand, when the copolymerization ratio is more than 90:10 or when the hydrogenation ratio of a side chain aromatic ring is less than 70%, the difference in performance between normal methyl methacrylate and MS resin (copolymer between methyl methacrylate and styrene) becomes small, and there become less merits of choosing to use it.

The modified polycarbonate resin is preferable to be a copolymer of 2,2-bis(4-hydroxy-3-methylphenyl)propane and 2,2-bis(4-hydroxyphenyl)propane, and to have a copolymerization ratio of them of 50:50 to 100:0. When the copolymerization ratio between 2,2-bis(4-hydroxy-3-methylphenyl)propane and 2,2-bis(4-hydroxyphenyl)propane is less than 50:50, the pencil hardness decreases and scratch resistance as a liquid crystal front plate is liable to be deteriorated.

Also, the modified polycarbonate resin is preferable to be a copolymer of 2,2-bis(4-hydroxy-3-methylphenyl)cyclohexane and 2,2-bis(4-hydroxyphenyl)propane, and to have a copolymerization ratio of them of 50:50 to 100:0. When the copolymerization ratio between 2,2-bis(4-hydroxy-3-methylphenyl)cyclohexane and 2,2-bis(4-hydroxyphenyl)propane is less than 50:50, the pencil hardness decreases and scratch resistance as a liquid crystal front plate is liable to be deteriorated.

Moreover, it is preferable to add an ultraviolet absorber to the acryl resin, the nuclear hydrogenated MS resin or the modified polycarbonate resin in 0.01 to 3.0% by weight for the purpose of maintaining weather resistance for a long period. Furthermore, in order to prevent heat deterioration of the acryl resin, the nuclear hydrogenated MS resin or the modified polycarbonate resin upon coextrusion molding, an antioxidant and an anti-coloring agent may be added. The antioxidant is preferable to be added in 0.01 to 3% by weight based on the acryl resin, the nuclear hydrogenated MS resin or the modified polycarbonate resin. The anti-coloring agent may be added in 0.01 to 3% by weight. When the total added amount of the ultraviolet absorber, the antioxidant and the anti-coloring agent is less than 0.1% by weight, sufficient weather resistance is not shown. Also, when the total added amount of them is more than 5%, not only can further improvement in weather resistance not be expected, but also 'bleed out' of these additives occurs, which causes whitening or also results in a decrease for adhesion and impact strength.

(Hard Coat Membrane)

The front plate 1 of a TN liquid crystal panel according to the invention is, as shown in FIG. 1, preferable to have a hard coat membrane 30 further formed on the top front surface or the top back surface (only on the top back surface in FIG. 1). Here, the hard coat membrane 30 refers to a membrane formed mainly on the hard resin layer 20 with a purpose of improving scratch resistance, and for example, a membrane formed by thermal curing or active energy ray curing a paint, and the like are used. It should be noted that the top front surface of the TN liquid crystal panel front plate refers to a surface closest to the user side of the TN liquid crystal panel front plate and the top back surface refers to a surface closest to a liquid crystal panel.

As one example of paints to be cured using active energy rays, a resin composition having a photopolymerization initiator as a curing catalyst added to a resin composition, comprising a single or a plurality of monofunctional or multifunctional acrylate monomers or oligomers, is included. Also, thermal curable resin paints include polyorganosiloxane based, crosslinkable acryl based and the like. Such resin compositions include ones commercially available as a hard coat agent for acryl resin or a hard coat agent for polycarbonate resin, and may be accordingly selected in consideration of compatibility with a hard coat application facility.

Among them, from the point of being able to realize high scratch resistance and high productivity, the hard coat membrane 30 is preferable to comprise an ultraviolet curable acryl based resin composition.

Also, if required, other than organic solvents, various stabilizing agents such as ultraviolet absorber, photostabilizer and antioxidant, surfactants such as reveling agent, antifoamer, thickening agent, antistatic agent and anti-fogging agent, and the like may be accordingly added to the paint.

Moreover, the hard coat membrane 30 is preferable to have the thickness within a range of 1 to 20 μm. When the thickness is less than 1 μm, sufficient scratch resistance is liable not to be performed, and on the other hand, when the thickness is more than 20 μm, secondary processability and impact resistance of the front plate 1 of a TN liquid crystal panel are liable to significantly decrease.

Furthermore, the membrane surface of a liquid crystal front plate having the hard coat membrane 30 formed is preferable to have the pencil hardness in a laminated state measured according to JIS5600-5-4 of at least 3H or more, in terms of ensuring the desired scratch resistance.

(Front Plate of TN Liquid Crystal Panel)

The front plate 1 of a TN liquid crystal panel according to the invention is provided with the structure described above, and is also preferably used for an TN liquid crystal display for visually recognizing a 3D image with liquid crystal shutter glasses on. In addition, the TN liquid crystal refers to a liquid crystal having a display method called TWISTED NEMATIC adopted.

As described above, only one example of embodiments of this invention has been shown, and various changes can be added according to Claims.

EXAMPLES

Below, embodiments of the invention will be described in further detail with reference to examples, but the embodiments are not limited to these examples.

Example

As an example of the invention, as shown in FIG. 1, the front plate 1 of a TN liquid crystal panel having the hard resin layer 20 (film thickness: 60 μm) formed on one surface of the polycarbonate resin sheet 10 (film thickness: 0.96 mm) and the hard coat membrane 30 (film thickness: 10 μm) further formed on the outmost surface was prepared.

In addition, a polycarbonate resin constituting the polycarbonate resin sheet 10 was a polycarbonate resin as homopolymer of 2,2-bis(4-hydroxyphenyl)propane, Lupilon E-2000N available from Mitsubishi Engineering-Plastics Corporation. Moreover, a resin constituting the hard resin layer 20 was methyl methacrylate resin Parapet HR-1000L manufactured by Kuraray Co., Ltd. and the pencil hardness at a laminated state measured according to JIS5600-5-4 was 2H. Furthermore, a resin composition constituting the hard coat membrane 30 was an ultraviolet curable acryl based resin composition comprising 90 parts of EB-220: hexafunctional urethane acrylate oligomer manufactured by Daicel-Cytec Company Ltd., 10 parts of #260: 1,9-nonandioldiacrylate manufactured by Osaka Organic Chemical Industry Ltd., and 3 parts of 1-184: 1-hydroxy-cyclohexyl phenyl ketone manufactured by Ciba Specialty Chemicals Inc., and the pencil hardness at a laminated state measured according to JIS5600-5-4 was 3H.

Also, the direction of the slow axis of the polycarbonate resin sheet 10 is inclined by 45° with respect to the lengthwise direction of the sheet 10.

Regarding specific preparation conditions of the front plate 1 of a TN liquid crystal panel describe above, as an extruder for extruding the polycarbonate resin, a single screw extruder having a barrel diameter of 75 mm and a screw L/D of 32 was used, and the cylinder temperature was set at 250° C. While simultaneously melt extruding two kinds of resins, the hard resin layer 20 was laminated on one surface of the polycarbonate resin sheet 10 within the feed block. The laminated and integrated resin was expanded to the predetermined sheet width within a T die set at 260° C., and then led to mirror finished, horizontally arranged, three polishing roll units. The set temperatures of three polishing rolls are 110° C. for the first roll temperature, 140° C. for the second roll temperature, and 185° C. for the third roll temperature respectively. A bank was formed in the roll gap being passed through first, passed through the second and the third roll, and taken up at a speed of 1.7 m/min to mold a coextruded sheet with a thickness of about 1.0 mm. In this regard, the number of rotations of the main extruder and the sub extruder was set so that the discharge ratio was main/sub=16/1.

At 4 m from the ends of three rolls, between a surface of the hard resin layer 20 of a coextruded sheet having the surface temperature adjusted at 80° C. and a PET film with a thickness of 100 μm, the ultraviolet curable resin composition comprising multifunctional acrylate monomer was sandwiched so that the film thickness after curing became 10 μm and crimped, ultraviolet was irradiated using a high pressure mercury lamp with an output density of 80 W/cm at a location of 12 cm under light source and with the condition of the conveyer speed of 1.7 m/min to cure, and a PET film was exfoliated after curing to obtain the front plate 1 of a TN liquid crystal panel.

Thereafter, the front plate 1 of a TN liquid crystal panel was cut. Cutting was performed with an angle of 45° C. with respect to the extrusion direction of the front plate 1 of a TN liquid crystal panel.

Comparative Example

The front plate of a TN liquid crystal panel of Comparative Example was prepared with the same conditions to Example, except that the front plate 1 of a TN liquid crystal panel was cut vertically with respect to the extrusion direction of the front plate 1 of a TN liquid crystal panel, and the direction of the slow axis of the polycarbonate resin sheet 10 is parallel or vertical with respect to the lengthwise direction of the sheet 10.

<Evaluation>

The front plates of a TN liquid crystal panel prepared in Example and Comparative Example were subjected to the following evaluation.

They were installed in an actual TN liquid crystal panel, then incorporated in a liquid crystal display device (3D display manufactured by NVIDIA). Then, an image displayed on a liquid crystal display was observed with TN liquid crystal shutter glasses for 3D (GEFORCE 3D VISION Model: P701) on.

Figure 4:
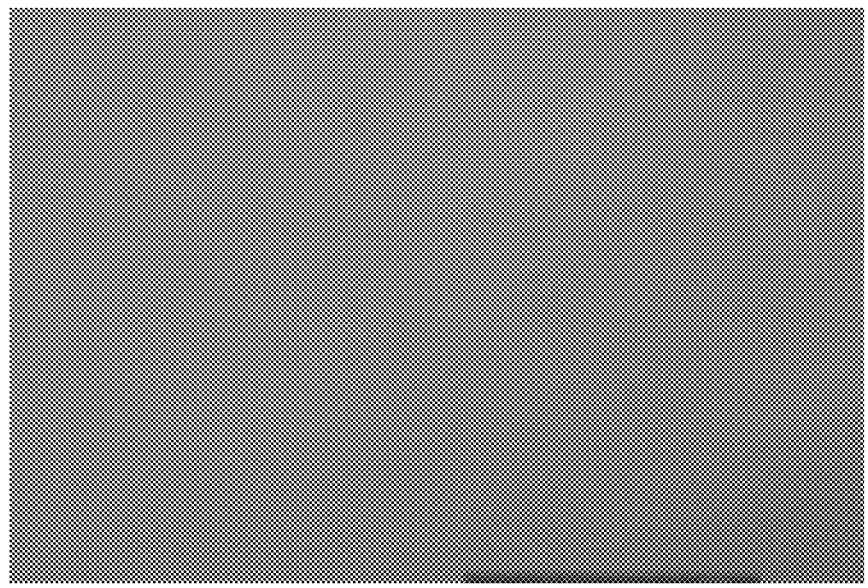
FIG. 4 is photographs where an image of a liquid crystal screen is observed through TN liquid crystal shutter glasses for 3D, wherein (a) shows the case where the front plate of a TN liquid crystal panel of Example is used, and (b) shows the case where the front plate of a TN liquid crystal panel of Comparative Example is used.
Figure 4:
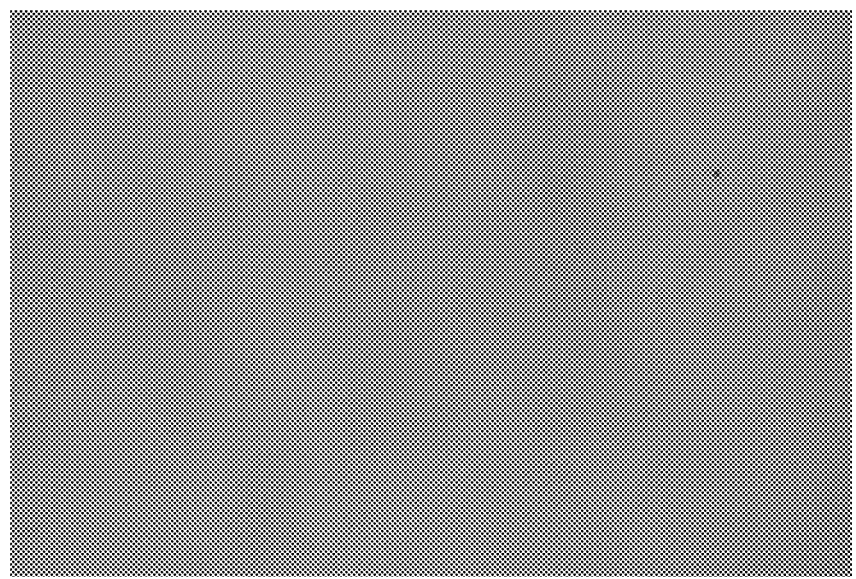

The result of observing an image on a liquid crystal screen through TN liquid crystal shutter glasses for 3D is shown in FIG. 4. FIG. 4 (a) is a state of using the front plate of a TN liquid crystal panel of Example, and FIG. 4 (b) is a state of using the front plate of a TN liquid crystal panel of Comparative Example.

As seen from FIGS. 4 (a) and (b), an image where the front plate of a TN liquid crystal panel of Example was used significantly improved occurrence of coloring and color unevenness as compared to an image where the front plate of a TN liquid crystal panel of Comparative Example was used. Also, Example and Comparative Example were prepared with the same conditions except for the inclination angle upon cutting (directions of the slow axis and the fast axis of a polycarbonate resin sheet), and it is clear that Example of the invention had good impact resistance, heat resistance and transparency as similar to the conventional one.

INDUSTRIAL APPLICABILITY

According to the invention, it is possible to provide a front plate of a TN liquid crystal panel capable of inhibiting coloring and color unevenness, caused by retardation of a polycarbonate resin sheet and unevenness thereof, even when a liquid crystal panel is observed through polarizing glasses or liquid crystal shutter glasses for 3D, while having excellent impact resistance, heat resistance and transparency.

EXPLANATION OF NUMERALS 1 front plate of TN liquid crystal panel
10 polycarbonate resin sheet
20 hard resin layer
30 hard coat membrane
100 TN liquid crystal panel
200 liquid crystal shutter glasses for 3D
210 glasses front side polarizing plate
220 twisted nematic liquid crystal layer
230 glasses back side polarizing plate
L lengthwise direction of polycarbonate resin sheet
W widthwise direction of polycarbonate resin sheet
X direction of slow axis
Y direction of fast axis

What is claimed is:

1. A display, comprising:
a TN liquid crystal panel having a planar direction and comprising a polycarbonate resin sheet, and
wherein the direction of a slow axis or a fast axis of the polycarbonate resin sheet is inclined by 45° with respect to a lengthwise direction of a TN liquid crystal panel releasing polarized light of an angle of 45° with respect to the plane of the TN liquid crystal panel, and
wherein the direction of the slow axis or the fast axis of the polycarbonate resin sheet and the direction of the slow axis or the fast axis of the TN liquid crystal panel releasing polarized light of an angle of 45° are parallel or orthogonal.

2. A front plate of a TN liquid crystal panel according to claim 1, wherein a polycarbonate resin constituting the polycarbonate resin sheet has 2,2-bis(4-hydroxyphenyl)propane as a main raw material monomer, a viscosity average molecular weight within a range of 20,000 to 30,000, and a glass transition temperature within a range of 130 to 160° C.

3. A front plate of a TN liquid crystal panel according to claim 1, wherein the polycarbonate resin sheet has a thickness within a range of 0.3 to 2 mm.

4. A front plate of a TN liquid crystal panel according to claim 1, further comprising a hard resin layer provided on the front surface or the back surface of the polycarbonate resin sheet with a thickness within a range of 30 to 100 μm and a pencil hardness at a laminated state measured according to JIS5600-5-4 of at least F or more, the hard resin layer is obtained by coextrusion molding with the polycarbonate resin.

5. A front plate of a TN liquid crystal panel according to claim 4, wherein the hard resin layer consists of an acryl resin, a resin (nuclear hydrogenated MS resin) obtained by hydrogenating an aromatic ring of a copolymer obtained by polymerizing at least one kind of (meth)acrylate ester monomer and at least one kind of aromatic vinyl monomer, or a modified polycarbonate resin having 2,2-bis(4-hydroxy-3-methylphenyl)propane or 2,2-bis(4-hydroxy-3-methylphenyl)cyclohexane as a main raw material monomer.

6. A front plate of a TN liquid crystal panel according to claim 5, wherein the acryl resin is methyl methacrylate as a main raw material monomer and the glass transition temperature of not less than 95° C.

7. A front plate of a TN liquid crystal panel according to claim 5, wherein the nuclear hydrogenated MS resin is a resin obtained by hydrogenating an aromatic ring of a copolymer obtained by polymerizing methyl methacrylate and styrene hydrogenated, a copolymerization ratio of them is within a range of 60:40 to 90:10, and a hydrogenation ratio of an aromatic ring is not less than 70%.

8. A front plate of a TN liquid crystal panel according to claim 5, wherein the modified polycarbonate resin is a copolymer of 2,2-bis(4-hydroxy-3-methylphenyl)propane and 2,2-bis(4-hydroxyphenyl)propane, and a copolymerization ratio of them is 50:50 to 100:0.

9. A front plate of a TN liquid crystal panel according to claim 5, wherein the modified polycarbonate resin is a copolymer of 2,2-bis(4-hydroxy-3-methylphenyl)cyclohexane and 2,2-bis(4-hydroxyphenyl)propane, and a copolymerization ratio of them is 50:50 to 100:0.

10. A front plate of a TN liquid crystal panel according claim 5, further comprising a hard coat membrane formed on the top front surface or the top back surface of the TN liquid crystal panel.

11. A front plate of a TN liquid crystal panel according to claim 10, wherein the hard coat membrane consists of an ultraviolet curable acryl based resin composition, the thickness is within a range of 1 to 20 μm, and the pencil hardness at a laminated state measured according to JIS5600-5-4 is 3H or more.

* * * * *